(12) United States Patent
Hava et al.

(10) Patent No.: US 11,502,589 B2
(45) Date of Patent: Nov. 15, 2022

(54) ROTOR OF AN INDUCTION MACHINE AND A METHOD FOR ASSEMBLING A CAGE WINDING OF THE ROTOR

(71) Applicant: The Switch Drive Systems Oy, Lappeenranta (FI)

(72) Inventors: Panu Hava, Lappeenranta (FI); Panu Kurronen, Lappeenranta (FI); Kimmo Heinonen, Lappeenranta (FI); Heikki Sallinen, Pulp (FI)

(73) Assignee: THE SWITCH DRIVE SYSTEMS OY, Lappeenranta (FI)

( * ) Notice: Subject to any disclaimer, the term of this patent is extended or adjusted under 35 U.S.C. 154(b) by 185 days.

(21) Appl. No.: 16/850,577

(22) Filed: Apr. 16, 2020

(65) Prior Publication Data

US 2020/0336057 A1 Oct. 22, 2020

(30) Foreign Application Priority Data

Apr. 17, 2019 (FI) .................................. 20195312

(51) Int. Cl.
*H02K 17/16* (2006.01)
*H02K 15/00* (2006.01)

(52) U.S. Cl.
CPC ....... *H02K 17/165* (2013.01); *H02K 15/0012* (2013.01)

(58) Field of Classification Search
CPC ...... H02K 17/165; H02K 17/16; H02K 17/18; H02K 17/185; H02K 17/20; H02K 17/205; H02K 1/26; H02K 1/22; H02K 15/0012

(Continued)

(56) References Cited

U.S. PATENT DOCUMENTS 3,694,906 A   10/1972   Rank et al.
3,996,486 A   12/1976   Madsen
(Continued)

FOREIGN PATENT DOCUMENTS

CN   101614452 A       12/2009
CN   101818283 A   *   9/2010
(Continued)

OTHER PUBLICATIONS

Finnish Search Report for Application No. 20195312, dated Nov. 14, 2019.

(Continued)

*Primary Examiner* — Michael Andrews
(74) *Attorney, Agent, or Firm* — Birch, Stewart, Kolasch & Birch, LLP

(57) ABSTRACT

A rotor of an induction machine includes a rotor core structure and a cage winding. The cage winding includes rotor bars in slots of the rotor core structure and end-rings connected to ends of the rotor bars. The ends of the rotor bars are attached to openings of the end-rings by expansion of the ends of the rotor bars in transverse directions of the rotor bars caused by axial press having been directed to the ends of the rotor bars. The material of the rotor bars is softer than the material of the end-rings. Thus, unwanted shape deformation of the end-rings can be avoided when the ends of the rotor bars are axially pressed. The material of the end-rings can be for example copper alloy with additions of chrome and zirconium, whereas the material of the rotor bars can be for example copper.

18 Claims, 3 Drawing Sheets

(58) Field of Classification Search
USPC .......... 310/211, 212, 156.78, 156.79, 156.81
See application file for complete search history.

(56) References Cited

U.S. PATENT DOCUMENTS

| | | | |
|---|---|---|---|
| 5,016,340 A | | 5/1991 | Kato |
| 2006/0273683 A1* | | 12/2006 | Caprio ................. H02K 17/165 |
| | | | 310/211 |
| 2017/0229932 A1* | | 8/2017 | Simons .................. H02K 15/02 |

FOREIGN PATENT DOCUMENTS

| | | | | |
|---|---|---|---|---|
| DE | 1 930 110 A1 | | 1/1971 | |
| DE | 195 42 962 C1 | | 11/1996 | |
| DE | 102012110157 A1 | * | 6/2014 | ............... H02K 1/30 |
| EP | 0749198 A2 | * | 12/1996 | ........... H02K 17/165 |
| GB | 856767 A | | 12/1960 | |
| JP | 56-22977 U | | 2/1981 | |
| JP | H05207708 A | * | 8/1993 | |
| JP | 2925991 B2 | | 7/1999 | |
| WO | WO 2015/188985 A1 | | 12/2015 | |

OTHER PUBLICATIONS

Extended European Search Report for European Application No. 20167643.4, dated Sep. 10, 2020.

* cited by examiner

ROTOR OF AN INDUCTION MACHINE AND A METHOD FOR ASSEMBLING A CAGE WINDING OF THE ROTOR

FIELD OF THE TECHNOLOGY

The disclosure relates generally to rotating electric machines. More particularly, the disclosure relates to a rotor of an induction machine. Furthermore, the disclosure relates to an induction machine and to a method for assembling a cage winding of a rotor of an induction machine.

BACKGROUND

Rotating electric machines, such as motors and generators, generally comprise a stator and a rotor which are arranged so that a magnetic flux is developed between these two. A rotor of an induction machine comprises typically a rotor core structure, a shaft, and a cage winding. The cage winding comprises rotor bars and end-rings. The rotor bars are located in slots of the rotor core structure. The end-rings are connected to the ends of the rotor bars at the end-regions of the rotor core structure. The rotor core structure is typically a laminated structure composed of ferromagnetic steel sheets which are electrically insulated from each other and which are stacked in the axial direction of the rotor. However, especially in many high-speed induction machines, a rotor core structure is made of solid steel. The rotor core structure made of solid steel may constitute, together with the shaft of the rotor, a single piece of solid steel.

In many induction machines, the rotor bars and the end-rings are manufactured as separate pieces of electrically conductive material and the end-rings are attached to the ends of the rotor bars with electrically conductive joints. The material of the rotor bars and of the end-rings can be for example copper or aluminum. The rotor bars can be attached to the end-rings for example by soldering, welding, brazing, or pressing the ends of the rotor bars axially to expand the ends of the rotor bars in transverse directions to form tight fits with walls of openings of the end-rings through which the rotor bars are protruding. The above-mentioned attachment methods are not free from challenges caused by e.g. temperature variations and mechanical vibrations. Furthermore, a fit between the rotor bars and the slots of the rotor core structure needs to have a clearance to allow assembly. During operation, the rotor bars may move outwards on the rotor, depending on the rotational speed. Movement of the rotor bars will affect the balance of the rotor and possibly lead to increased mechanical vibration and damages to machinery.

SUMMARY

The following presents a simplified summary in order to provide a basic understanding of some embodiments of the invention. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In this document, the word "geometric" when used as a prefix means a geometric concept that is not necessarily a part of any physical object. The geometric concept can be for example a geometric point, a straight or curved geometric line, a geometric plane, a non-planar geometric surface, a geometric space, or any other geometric entity that is zero, one, two, or three dimensional. In this document, the word "between" is not limited to cases where an entity that is between two other entities is in contact with the other entities, but the first mentioned entity can be a distance away from one or both of the other entities.

In accordance with the invention, there is provided a new rotor for an induction machine. A rotor according to the invention comprises:
- a rotor core structure,
- a plurality of rotor bars in slots of the rotor core structure, and
- end-rings electrically connecting ends of the rotor bars to each other at both ends of a cage winding constituted by the rotor bars and the end-rings.

The ends of the rotor bars are attached to openings of the end-rings by expansion of the ends of the rotor bars in transverse directions of the rotor bars, the expansion being caused by axial press having been directed to the ends of the rotor bars during manufacture of the rotor. The material of the rotor bars is softer than the material of the end-rings. Thus, unwanted shape deformations of the end-rings can be avoided when the ends of the rotor bars are axially pressed and transversely expanded. An advantage provided by the harder end-rings and the softer rotor bars is that mechanical strength of the cage winding is improved whilst it is still possible to attach the rotor bars to the end-rings by axially pressing the ends of the rotor bars. The material of the end-rings can be for example copper alloy with additions of chrome and zirconium i.e. CuCrZr, and the material of the rotor bars can be for example copper.

The rotor according to the invention further comprises one or more ring-shaped disc springs surrounding a geometric axis of rotation of the rotor. The one or more ring-shaped disc springs are axially between the end-rings and radially between the rotor bars and the geometric axis of rotation of the rotor. The one or more ring-shaped disc springs are axially compressed and, as a corollary of the axial compression, the one or more ring-shaped disc springs are radially spread against the rotor bars so that the one or more ring-shaped disc springs are arranged to press the rotor bars radially away from the geometric axis of rotation of the rotor. Thus, the rotor bars are pressed outwards all the time and therefore the centrifugal force does not move the rotor bars. Therefore, the balance of the rotor can be maintained during rotation of the rotor.

In accordance with the invention, there is provided also a new induction machine. An induction machine according to the invention comprises:
- a stator comprising stator windings, and
- a rotor according to the invention, the rotor being rotatably supported with respect to the stator.

In accordance with the invention, there is provided also a new method for assembling a cage winding of a rotor of an induction machine. A method according to the invention comprises:
- placing rotor bars into slots of a rotor core structure so that, at ends of the rotor core structure, ends of the rotor bars protrude axially out from the rotor core structure,
- placing end-rings so that the ends of the rotor bars protrude axially through openings of the end-rings, and
- directing axial press to the ends of the rotor bars to attach the ends of the rotor bars to the openings of the end-rings by expansion of the ends of the rotor bars in transverse directions of the rotor bars, the expansion being caused by the axial press and the material of the rotor bars being softer than the material of the end-rings.

In the method according to the invention, one or more ring-shaped disc springs are placed to surround a geometric axis of rotation of the rotor and subsequently the end-rings are placed so that the one or more ring-shaped disc springs get axially between the end-rings and radially between the rotor bars and the geometric axis of rotation of the rotor and the one or more ring-shaped disc springs get axially compressed. As a corollary of the axial compression, the one or more ring-shaped disc springs are radially spread against the rotor bars so that the one or more ring-shaped disc springs press the rotor bars radially away from the geometric axis of rotation of the rotor.

Exemplifying and non-limiting embodiments are described in accompanied dependent claims.

Various exemplifying and non-limiting embodiments both as to constructions and to methods of operation, together with additional objects and advantages thereof, will be best understood from the following description of specific exemplifying embodiments when read in conjunction with the accompanying drawings.

The verbs "to comprise" and "to include" are used in this document as open limitations that neither exclude nor require the existence of also un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments and their advantages are explained in greater detail below in the sense of examples and with reference to the accompanying drawings, in which.

DESCRIPTION OF EXEMPLIFYING AND NON-LIMITING EMBODIMENTS

The specific examples provided in the description given below should not be construed as limiting the scope and/or the applicability of the appended claims. Furthermore, it is to be understood that lists and groups of examples provided in the description given below are not exhaustive unless otherwise explicitly stated.

Figure 1A:
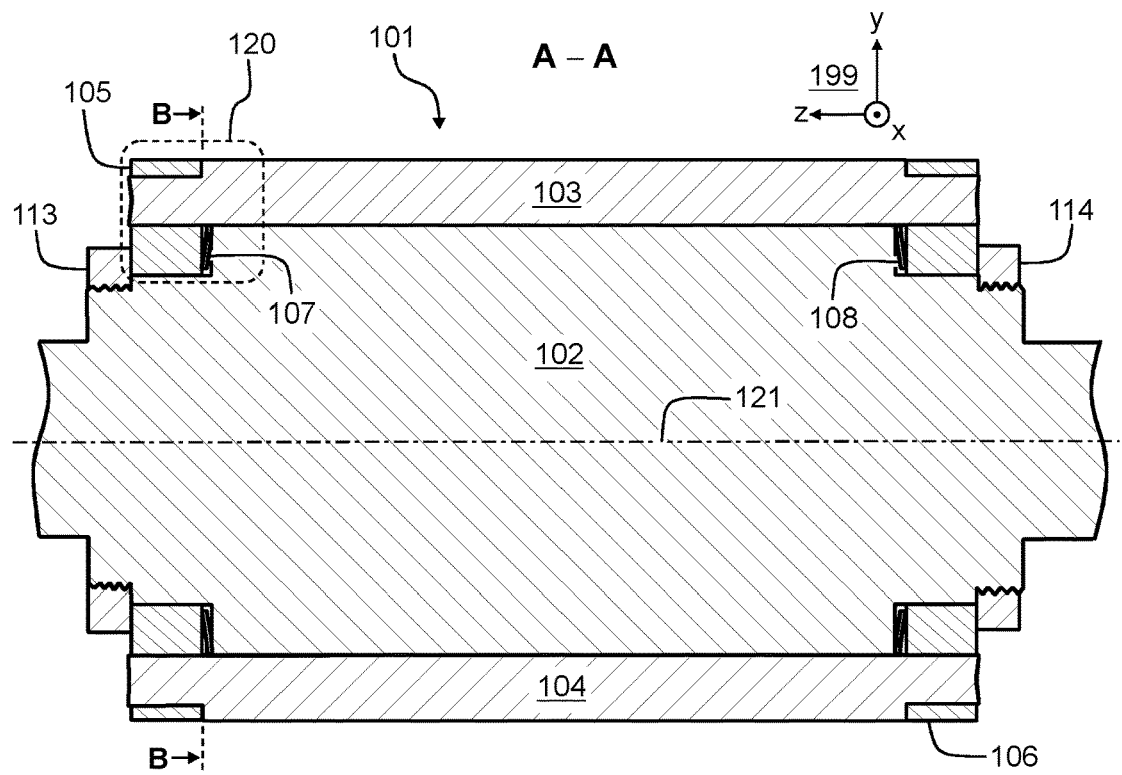
FIGS. 1a, 1b, and 1c illustrate a rotor according to an exemplifying and non-limiting embodiment.
Figure 1B:
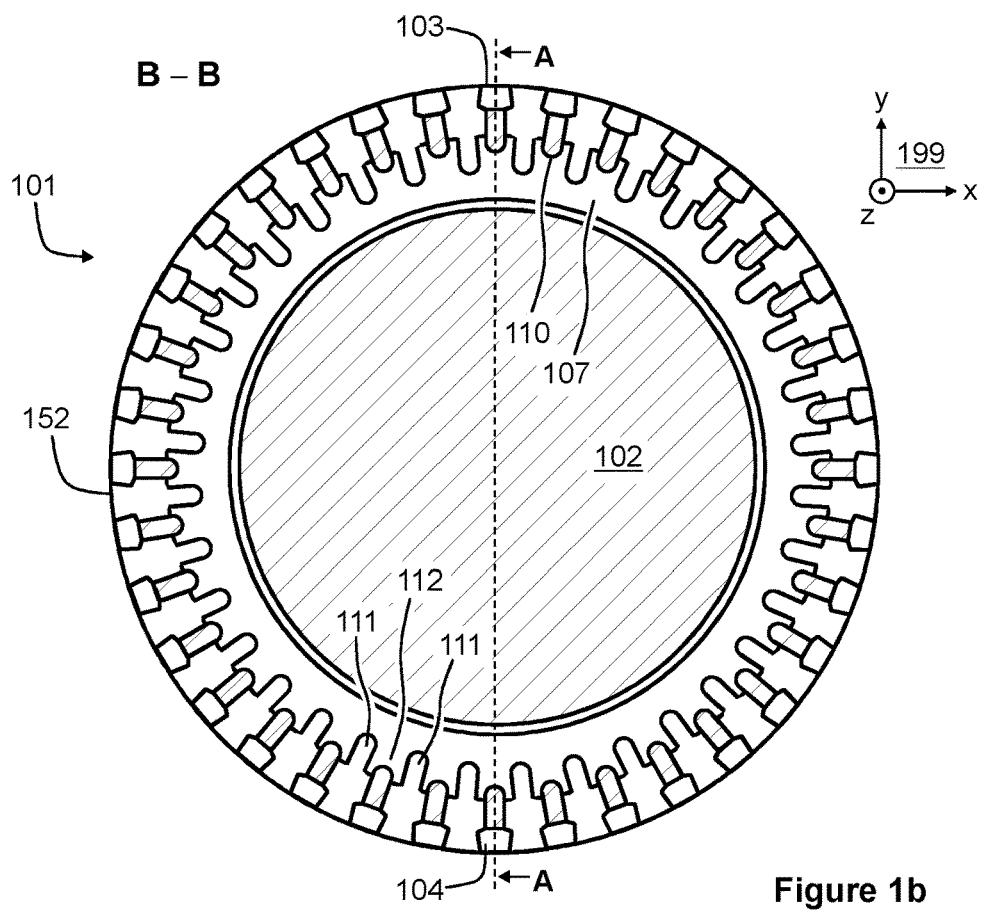
Figure 1C:
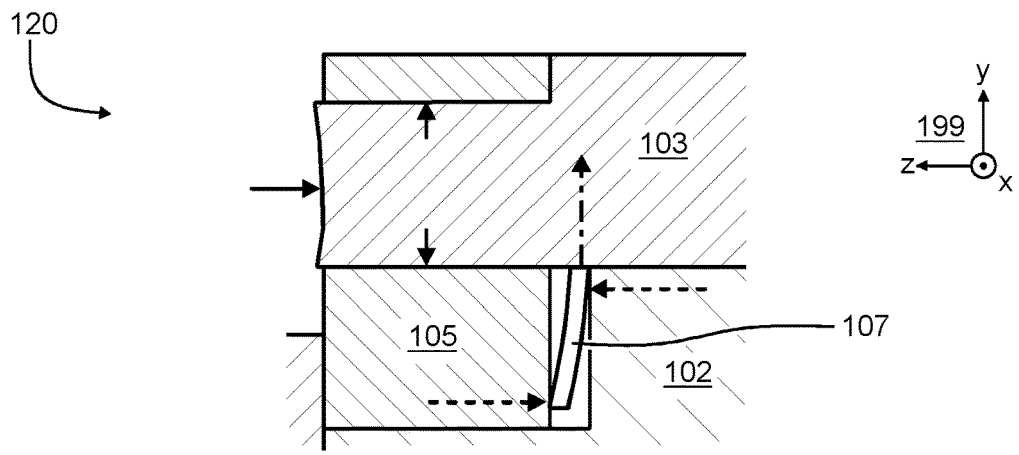

FIGS. 1a and 1b show section views of a rotor 101 according to an exemplifying and non-limiting embodiment. The section shown in FIG. 1a is taken along a geometric line A-A shown in FIG. 1b so that a geometric section plane is parallel with the yz-plane of a coordinate system 199. The section shown in FIG. 1b is taken along a geometric line B-B shown in FIG. 1a so that a geometric section plane is parallel with the xy-plane of the coordinate system 199. FIG. 1c shows a magnification of a part 120 of FIG. 1a. The rotor 101 comprises a rotor core structure 102. In this exemplifying case, the rotor core structure 102 is made of solid ferromagnetic steel and the rotor core structure and a shaft of the rotor constitute a single piece of solid steel. It is however also possible that a rotor according to an exemplifying and non-limiting embodiment comprises a rotor core structure that comprises a stack of ferromagnetic steel sheets so that the ferromagnetic steel sheets are electrically insulated from each other and stacked on each other in the axial direction of the rotor.

The rotor 101 comprises a cage winding that comprises a plurality of rotor bars located in slots of the ferromagnetic core structure 102. In FIGS. 1a and 1b, two of the rotor bars are denoted with references 103 and 104. In this exemplifying case, the slots of the rotor core structure 102 are open slots having slot openings on the airgap surface 152 of the rotor core structure 102. It is however also possible that a rotor according to an exemplifying and non-limiting embodiment comprises a rotor core structure that comprises closed slots. The cage winding comprises two end-rings 105 and 106. The end-ring 105 connects ends of the rotor bars electrically to each other at a first end of the rotor core structure 102. Correspondingly, the end-ring 106 connects ends of the rotor bars electrically to each other at the second end of rotor core structure 102. The rotor bars are located in the slots of the rotor core structure 102 so that, at each end of the rotor core structure, ends of the rotor bars protrude axially out from the rotor core structure 102 and axially through openings of the end-rings 105 and 106. The ends of the rotor bars are attached to the openings of the end-rings by expansion of the ends of the rotor bars in transverse directions of the rotor bars, where the expansion has been caused by axial press directed to the ends of the rotor bars during manufacture of the rotor. In FIG. 1c, the axial press and the transversal expansion are depicted with solid line arrows. A tool for axially pressing the rotor bars may comprise for example a point-form tip or a line-form ridge that is against an end surface of a rotor bar being axially pressed. The material of the rotor bars is softer than the material of the end-rings. Thus, unwanted shape deformations of the end-rings can be avoided when the ends of the rotor bars are axially pressed and transversely expanded. The material of the end-rings can be for example copper alloy with additions of chrome and zirconium i.e. CuCrZr, and the material of the rotor bars can be for example copper Cu.

The exemplifying rotor 101 illustrated in FIGS. 1a-1c comprises ring-shaped disc springs 107 and 108 surrounding a geometric axis of rotation 121. The ring-shaped disc springs 107 and 108 are axially between the rotor core structure 102 and the end-rings and radially between the rotor bars and the geometric axis of rotation 121. The ring-shaped disc springs are axially compressed between the end-rings and the rotor core structure and, as a corollary of the axial compression, the ring-shaped disc springs are radially spread against the rotor bars so that the ring-shaped disc springs are arranged to press the rotor bars radially away from the geometric axis of rotation 121. In FIG. 1c, the axial compression directed to the ring-shaped disc spring 107 is depicted with dashed line arrows and radial press directed to the bottom of the rotor bar 103 is depicted with a dash-and-dot line arrow.

In the exemplifying rotor 101 illustrated in FIGS. 1a-1c, the outer circumferences of the ring-shaped disc springs 107 and 108 are slotted so that the outer circumferences of the ring-shaped disc springs have radially extending locking slots being fit with the bottoms of the rotor bars to prevent the ring-shaped disc springs from rotating with respect to the rotor core structure 102. In FIG. 1b, one of the locking slots is depicted with a reference 110. Furthermore, in this exemplifying case, the outer circumferences of the ring-shaped disc springs 107 and 108 have radially extending decoupling slots that are circumferentially between the rotor bars and radially deeper than the radially extending locking slots. In FIG. 1b, two of the radially extending decoupling slots are depicted with a reference 111. Portions of the ring-shaped disc springs between adjacent ones of the radially extending decoupling slots constitute spring arms each of which presses one of the rotor bars radially away from the geometric axis of rotation 121. In FIG. 1b, one of the spring arms is denoted with a reference 112. The radial pressing force is maintained at each rotor bar individually due to decoupling of the spring arms of the ring-shaped disc springs 107 and 108, i.e. each of the ring-shaped disc springs comprises a rotor bar-specific spring arm for each rotor bar.

The exemplifying rotor 101 illustrated in FIGS. 1a-1c comprises lock nuts 113 and 114 surrounding the geometric axis of rotation 121 of the rotor. As illustrated in FIG. 1a, the lock nuts 113 and 114 are installed on threaded portions of the rotor and the lock nuts 113 and 114 are arranged to press the end-rings 105 and 106 axially towards the rotor core structure 102. It is however also possible that a different mechanical arrangement is used for securing the end-rings. A rotor according to an exemplifying and non-limiting embodiment may comprise e.g. bolts which extend axially through end-rings to a rotor core structure. In some cases, e.g. in cases where there are no disc springs between a rotor core structure and end-rings, joints between rotor bars and the end-rings may suffice for keeping the end-rings at their places.

In the exemplifying rotor 101 illustrated in FIGS. 1a-1c, a first one 107 of the ring-shaped disc springs is axially between the rotor core structure 102 and a first one 105 of the end-rings, the first one of the ring-shaped disc springs is axially compressed between the rotor core structure and the first one of the end-rings, a second one 108 of the ring-shaped disc springs is axially between the rotor core structure and a second one 106 of the end-rings, and the second one of the ring-shaped disc springs is axially compressed between the rotor core structure and the second one of the end-rings.

In a rotor according to an exemplifying and non-limiting embodiment where a rotor core structure comprises axially successive ferromagnetic elements e.g. axially stacked sheets or plates, it is also possible that one or more ring-shaped disc springs are between the axially successive ferromagnetic elements and not in contact with the end-rings. In this exemplifying case, the one or more ring-shaped disc springs do not need to be near to the joints between the rotor bars and the end-rings and thus smaller radial forces caused by the one or more ring-shaped disc springs suffice for pressing the rotor bars radially away from the geometric axis of rotation of the rotor. In a rotor according to an exemplifying and non-limiting embodiment, there is only one ring-shaped disc spring at the middle of the rotor core structure. In a rotor according to another exemplifying and non-limiting embodiment, there are three or more ring-shaped disc springs axially successively between the end-rings.

Figure 2:
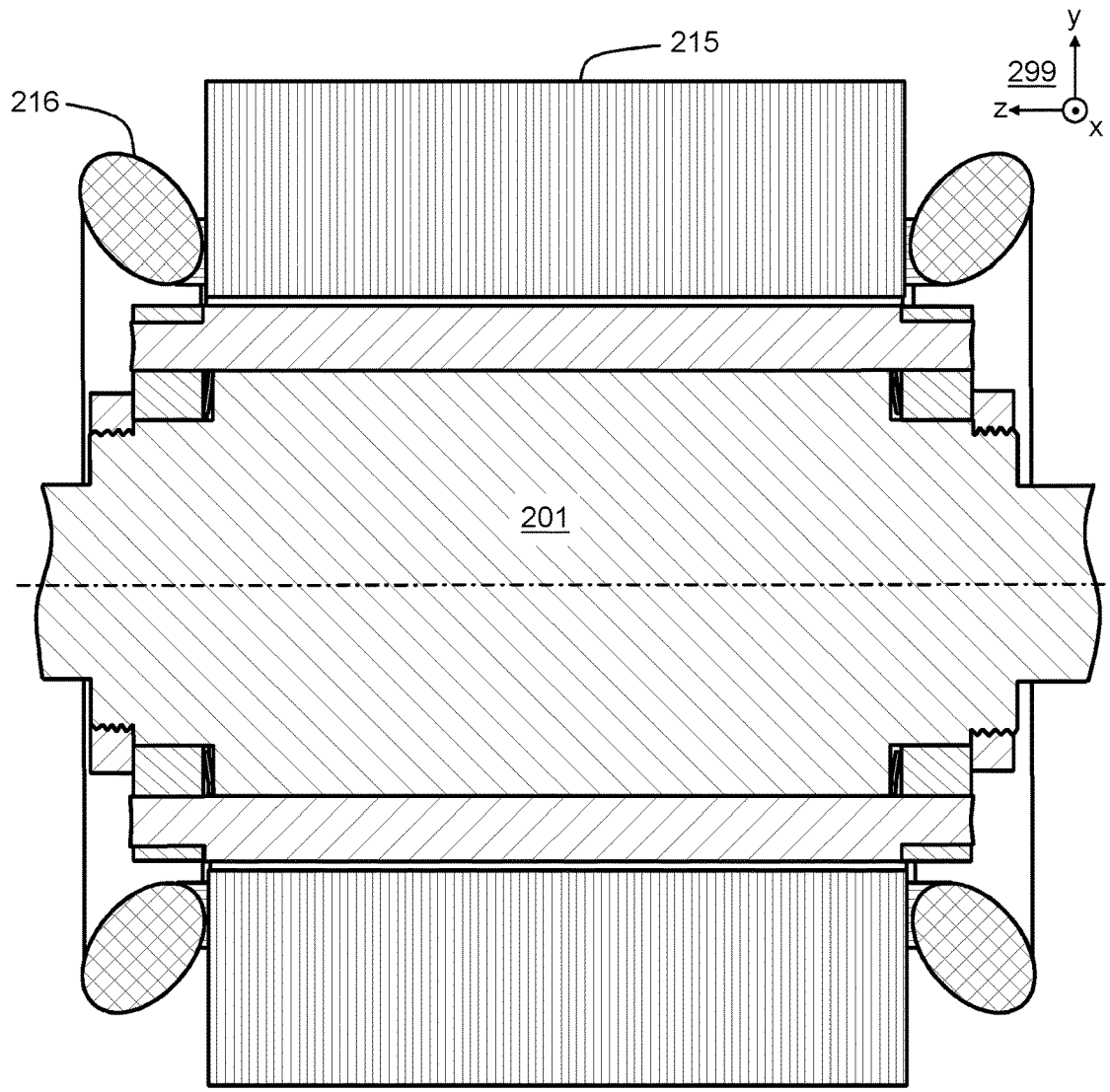
FIG. 2 illustrates an electric machine according to an exemplifying and non-limiting embodiment.

FIG. 2 shows a section view of an induction machine according to an exemplifying and non-limiting embodiment. The geometric section plane is parallel with the yz-plane of a coordinate system 299. The induction machine comprises a stator 215 and a rotor 201 according to an exemplifying and non-limiting embodiment of the invention. The rotor 201 is rotatably supported with respect to the stator 215. Arrangements for rotatably supporting the rotor 201 with respect to the stator 215 are not shown in FIG. 2. The stator 215 comprises stator windings 216 for generating a rotating magnetic field in response to being supplied with alternating currents. The stator windings 216 can be for example a three-phase winding. The rotor 201 can be for example such as illustrated in FIGS. 1a-1c.

Figure 3:
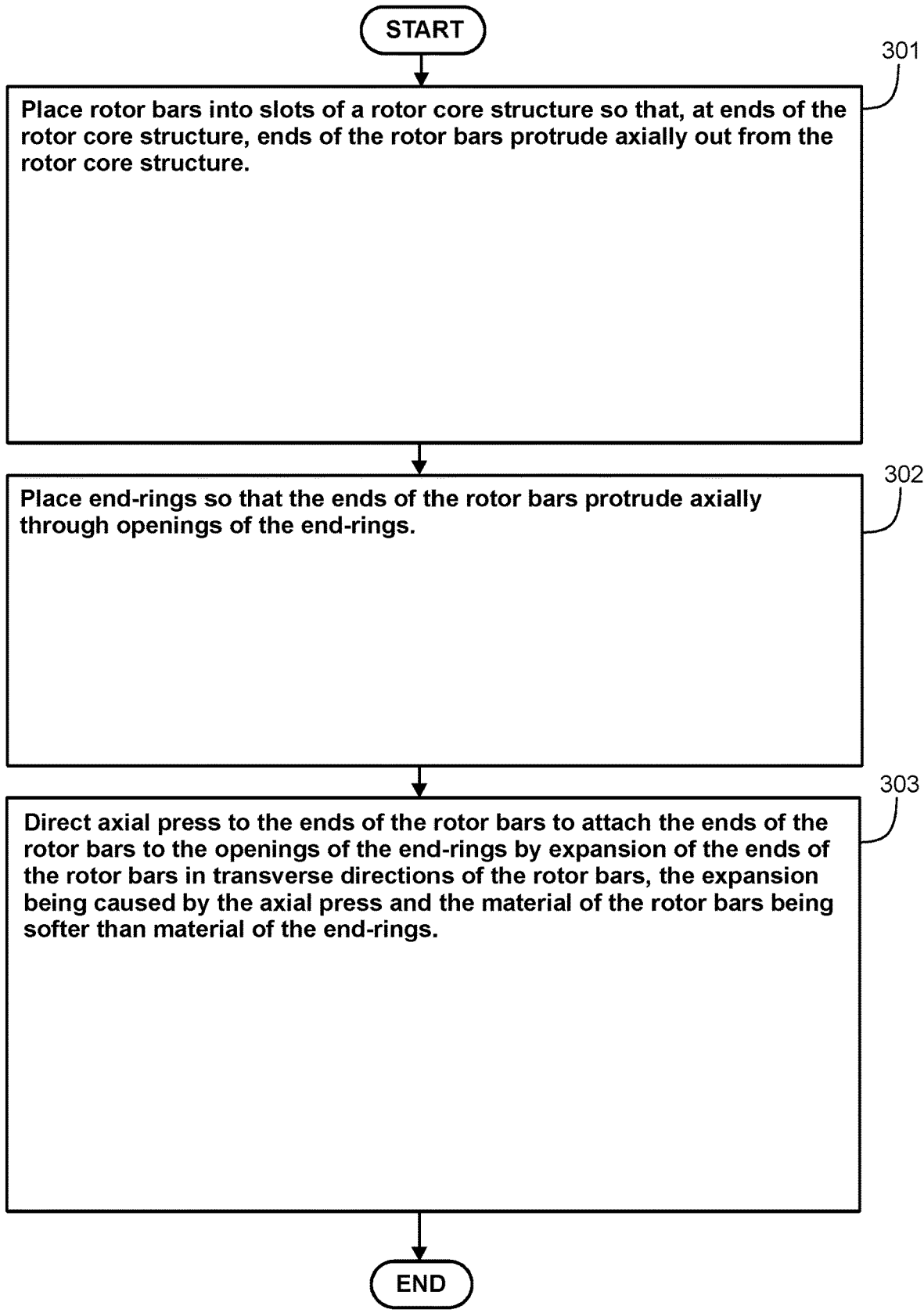
FIG. 3 shows a flowchart of a method according to an exemplifying and non-limiting embodiment for assembling a cage winding of a rotor of an induction machine.

FIG. 3 shows a flowchart of a method according to an exemplifying and non-limiting embodiment for assembling a cage winding of a rotor of an induction machine. The method comprises the following actions:

action 301: placing rotor bars into slots of a rotor core structure so that, at ends of the rotor core structure, ends of the rotor bars protrude axially out from the rotor core structure, action 302: placing end-rings so that the ends of the rotor bars protrude axially through openings of the end-rings, and action 303: directing axial press to the ends of the rotor bars to attach the ends of the rotor bars to the openings of the end-rings by expansion of the ends of the rotor bars in transverse directions of the rotor bars, the expansion being caused by the axial press and the material of the rotor bars being softer than the material of the end-rings.

In a method according to an exemplifying and non-limiting embodiment, the material of the end-rings is copper alloy with additions of chrome and zirconium and the material of the rotor bars is copper.

A method according to an exemplifying and non-limiting embodiment comprises softening the material of the rotor bars by annealing prior to the placing the rotor bars into the slots of the rotor core structure. In this exemplifying case, depending on the material of the rotor bars e.g. copper, the axial press and deformation caused by the axial press may re-harden the material of the rotor bars.

A method according to an exemplifying and non-limiting embodiment comprises placing one or more ring-shaped disc springs to surround a geometric axis of rotation of the rotor and subsequently placing the end-rings so that:

the one or more ring-shaped disc springs get axially between the end-rings, the one or more ring-shaped disc springs get radially between the rotor bars and the geometric axis of rotation of the rotor, and the one or more ring-shaped disc springs get axially compressed and, as a corollary of the axial compression, are radially spread against the rotor bars so that the one or more ring-shaped disc springs press the rotor bars radially away from the geometric axis of rotation of the rotor.

In a method according to an exemplifying and non-limiting embodiment, a first one of the ring-shaped disc springs is placed axially between the rotor core structure and a first one of the end-rings, the first one of the ring-shaped disc springs is axially compressed between the rotor core structure and the first one of the end-rings, a second one of the ring-shaped disc springs is placed axially between the rotor core structure and a second one of the end-rings, and the second one of the ring-shaped disc springs is axially compressed between the rotor core structure and the second one of the end-rings.

In a method according to an exemplifying and non-limiting embodiment, the outer circumferences of the ring-shaped disc springs are slotted so that the outer circumferences of the ring-shaped disc springs have radially extending locking slots being fit with bottoms of the rotor bars to prevent the ring-shaped disc springs from rotating with respect to the rotor core structure.

In a method according to an exemplifying and non-limiting embodiment, the outer circumferences of the ring-shaped disc springs have radially extending decoupling slots circumferentially between the radially extending locking slots and radially deeper than the radially extending locking slots. Portions of the ring-shaped disc springs between adjacent ones of the radially extending decoupling slots constitute spring arms each of which presses one of the rotor bars radially away from the geometric axis of rotation of the rotor.

A method according to an exemplifying and non-limiting embodiment comprises installing lock nuts on threaded portions of the rotor so that the lock nuts surround the geometric axis of rotation of the rotor and press the end-rings axially towards the rotor core structure.

The specific examples provided in the description given above should not be construed as limiting the scope and/or the applicability of the appended claims. Lists and groups of examples provided in the description given above are not exhaustive unless otherwise explicitly stated.

What is claimed is:

1. A rotor for an induction machine, the rotor comprising:
   a rotor core structure;
   a plurality of rotor bars in slots of the rotor core structure; and
   end-rings electrically connecting ends of the rotor bars to each other at both ends of a cage winding constituted by the rotor bars and the end-rings,
   wherein the ends of the rotor bars are attached to openings of the end-rings by expansion of the ends of the rotor bars in transverse directions of the rotor bars, the expansion being caused by axial press having been directed to the ends of the rotor bars,
   wherein a material of the rotor bars is softer than a material of the end-rings, and
   wherein the rotor further comprises one or more ring-shaped disc springs surrounding a geometric axis of rotation of the rotor, the one or more ring-shaped disc springs being axially between the end-rings and radially between the rotor bars and the geometric axis of rotation of the rotor, and the one or more ring-shaped disc springs being axially compressed and, as a corollary of axial compression, being radially spread against the rotor bars so that the one or more ring-shaped disc springs directly contact the rotor bars to press the rotor bars radially away from the geometric axis of rotation of the rotor.

2. The rotor according to claim 1, wherein the material of the end-rings is copper alloy with additions of chrome and zirconium and the material of the rotor bars is copper.

3. The rotor according to claim 1, wherein a first one of the ring-shaped disc springs is axially between the rotor core structure and a first one of the end-rings, the first one of the ring-shaped disc springs is axially compressed between the rotor core structure and the first one of the end-rings, a second one of the ring-shaped disc springs is axially between the rotor core structure and a second one of the end-rings, and the second one of the ring-shaped disc springs is axially compressed between the rotor core structure and the second one of the end-rings.

4. The rotor according to claim 3, wherein an outer circumference of each of the ring-shaped disc springs is slotted so that the outer circumference of each of the ring-shaped disc springs has radially extending locking slots being fit with a bottom of each of the rotor bars to prevent each of the ring-shaped disc springs from rotating with respect to the rotor core structure.

5. The rotor according to claim 4, wherein an outer circumference of each of the ring-shaped disc springs has radially extending decoupling slots circumferentially between the rotor bars and radially deeper than the radially extending locking slots, portions of each of the ring-shaped disc springs between adjacent ones of the radially extending decoupling slots constituting spring arms each of which is arranged to press one of the rotor bars radially away from the geometric axis of rotation of the rotor.

6. The rotor according to claim 1, wherein an outer circumference of each of the ring-shaped disc springs is slotted so that the outer circumference of each of the ring-shaped disc springs has radially extending locking slots being fit with a bottom of each of the rotor bars to prevent each of the ring-shaped disc springs from rotating with respect to the rotor core structure.

7. The rotor according to claim 6, wherein an outer circumference of each of the ring-shaped disc springs has radially extending decoupling slots circumferentially between the rotor bars and radially deeper than the radially extending locking slots, portions of each of the ring-shaped disc springs between adjacent ones of the radially extending decoupling slots constituting spring arms each of which is arranged to press one of the rotor bars radially away from the geometric axis of rotation of the rotor.

8. The rotor according to claim 1, wherein the rotor comprises lock nuts surrounding the geometric axis of rotation of the rotor, installed on threaded portions of the rotor, and arranged to press the end-rings axially towards the rotor core structure.

9. The rotor according to claim 1, wherein the rotor core structure is made of solid steel.

10. The rotor according to claim 1, wherein a space is formed axially between the rotor core structure and each of the end-rings and radially between the rotor bars and the rotor core structure, and
    wherein the one or more ring-shaped disc springs is in the space.

11. The rotor according to claim 1, wherein each end-ring has an inner diameter, an outer diameter and a width between the inner diameter and outer diameter,
    wherein the width is constant about a circumference of each end spring.

12. An induction machine comprising:
    a stator comprising stator windings; and
    a rotor rotatably supported with respect to the stator,
    wherein the rotor comprises:
        a rotor core structure;
        a plurality of rotor bars in slots of the rotor core structure; and
        end-rings electrically connecting ends of the rotor bars to each other at both ends of a cage winding constituted by the rotor bars and the end-rings,
    wherein the ends of the rotor bars are attached to openings of the end-rings by expansion of the ends of the rotor bars in transverse directions of the rotor bars, the expansion being caused by axial press having been directed to the ends of the rotor bars, wherein a material of the rotor bars is softer than a material of the end-rings, and wherein the rotor further comprises one or more ring-shaped disc springs surrounding a geometric axis of rotation of the rotor, the one or more ring-shaped disc springs being axially between the end-rings and radially between the rotor bars and the geometric axis of rotation of the rotor, and the one or more ring-shaped disc springs being axially compressed and, as a corollary of axial compression, being radially spread against the rotor bars so that the one or more ring-shaped disc springs directly contact the rotor bars to press the rotor bars radially away from the geometric axis of rotation of the rotor.

13. A method for assembling a cage winding of a rotor of an induction machine, the method comprising:
placing rotor bars into slots of a rotor core structure so that, at ends of the rotor core structure, ends of the rotor bars protrude axially out from the rotor core structure;
placing end-rings so that the ends of the rotor bars protrude axially through openings of the end-rings; and
directing axial press to the ends of the rotor bars to attach the ends of the rotor bars to the openings of the end-rings by expansion of the ends of the rotor bars in transverse directions of the rotor bars, the expansion being caused by the axial press,
wherein a material of the rotor bars is softer than a material of the end-rings, and
wherein one or more ring-shaped disc springs are placed to surround a geometric axis of rotation of the rotor and subsequently the end-rings are placed so that the one or more ring-shaped disc springs get axially between the end-rings and radially between the rotor bars and the geometric axis of rotation of the rotor and the one or more ring-shaped disc springs get axially compressed and, as a corollary of axial compression, are radially spread against the rotor bars so that the one or more ring-shaped disc springs directly contact and press the rotor bars radially away from the geometric axis of rotation of the rotor.

14. The method according to claim 13, wherein the method comprises softening the material of the rotor bars by annealing prior to the placing the rotor bars into the slots of the rotor core structure.

15. The method according to claim 13, wherein the material of the end-rings is copper alloy with additions of chrome and zirconium and the material of the rotor bars is copper.

16. The method according to claim 13, wherein an outer circumference of each of the ring-shaped disc springs is slotted so that the outer circumference of each of the ring-shaped disc springs has radially extending locking slots being fit with a bottom of each of the rotor bars to prevent the ring-shaped disc spring from rotating with respect to the rotor core structure.

17. The method according to claim 16, wherein the an outer circumference of each of the ring-shaped disc springs has radially extending decoupling slots circumferentially between the radially extending locking slots and radially deeper than the radially extending locking slots, portions of each of the ring-shaped disc springs between adjacent ones of the radially extending decoupling slots constituting spring arms each of which pressing one of the rotor bars radially away from the geometric axis of rotation of the rotor.

18. The method according to any claim 13, wherein the method comprises installing lock nuts on threaded portions of the rotor so that the lock nuts surround the geometric axis of rotation of the rotor and press the end-rings axially towards the rotor core structure.

* * * * *